United States Patent [19]

Okawachi

[11] Patent Number: 4,484,874
[45] Date of Patent: Nov. 27, 1984

[54] TIRE VULCANIZING PRESS

[75] Inventor: Toshio Okawachi, Nagasaki, Japan

[73] Assignee: Mitsubishi Jukogyo Kabushiki Kaisha, Tokyo, Japan

[21] Appl. No.: 433,523

[22] Filed: Oct. 8, 1982

[30] Foreign Application Priority Data

Oct. 23, 1981 [JP] Japan .................................. 56-168601

[51] Int. Cl.³ .......................... B29H 5/02; B29H 5/08
[52] U.S. Cl. .................... 425/47; 425/34 R; 425/451.2
[58] Field of Search ............ 425/28 R, 3 R, 33, 34 R, 425/35, 36, 47, 450.1, 451.9, 451.2

[56] References Cited

U.S. PATENT DOCUMENTS

| 3,687,590 | 8/1972 | Cyriax | 425/450.1 X |
| 3,737,278 | 6/1973 | Putzler | 425/451.2 |
| 4,130,384 | 12/1978 | MacMillan | 425/25 |
| 4,201,533 | 5/1980 | Holzschuh | 425/451.9 |
| 4,383,816 | 5/1983 | Kumazaki | 425/47 X |
| 4,448,575 | 5/1984 | Hanyu et al. | 425/47 |

FOREIGN PATENT DOCUMENTS

| 1006590 | 4/1957 | Fed. Rep. of Germany ... 425/450.1 |
| 1912240 | 9/1970 | Fed. Rep. of Germany ... 425/450.1 |

Primary Examiner—Jan Silbaugh
Attorney, Agent, or Firm—Birch, Stewart, Kolasch & Birch

[57] ABSTRACT

A tire vulcanizing press which is constructed such that a die assembly is tightly closed by means of a press cylinder with a raising and lowering table disposed therebetween. A spacer is displaceably disposed between the press cylinder and the raising and lowering table so that a predetermined die closing force is transmitted from the press cylinder to the die assembly via the spacer and the raising and lowering table when the die assembly is tightly closed.

5 Claims, 4 Drawing Figures

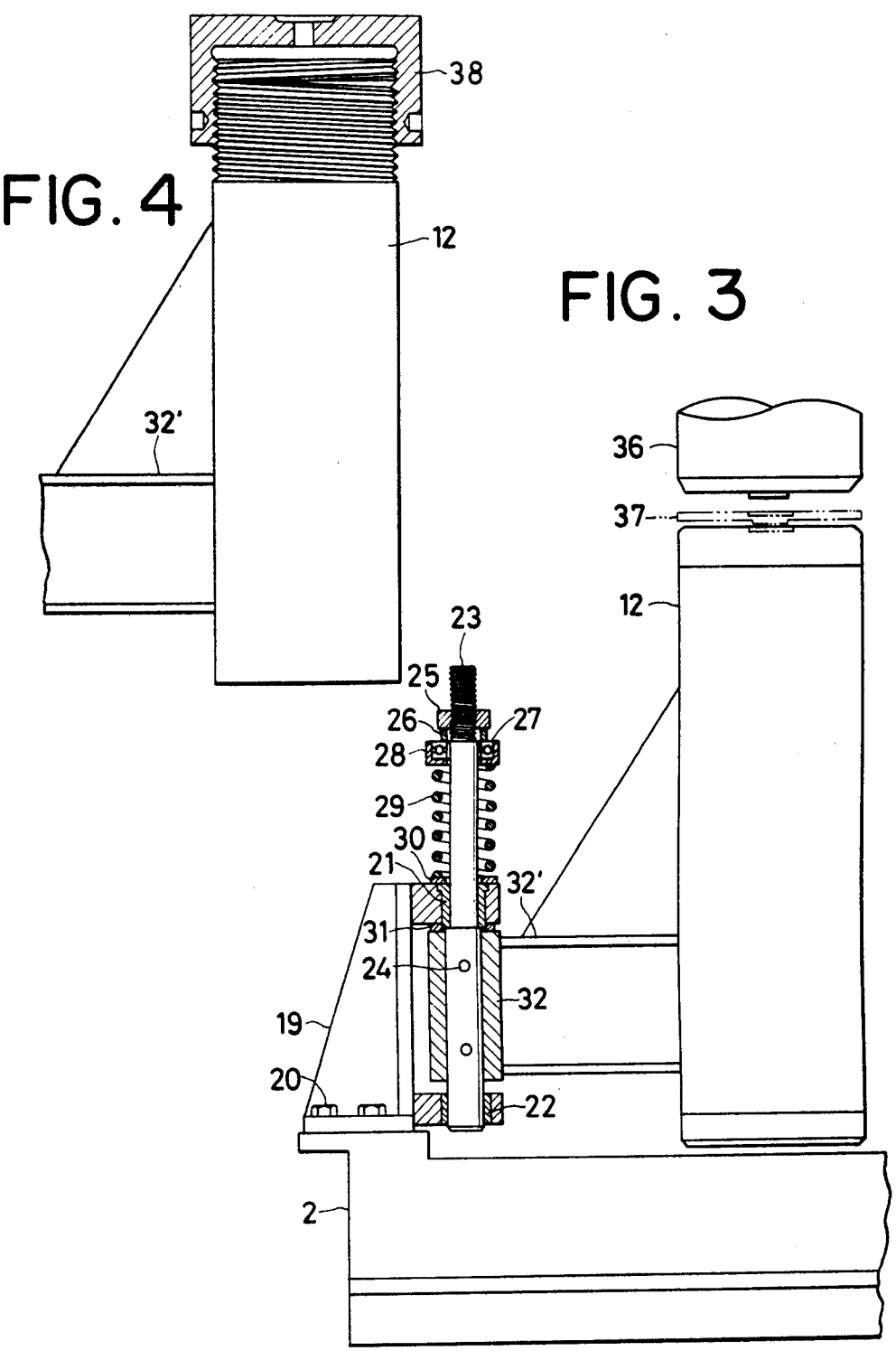

TIRE VULCANIZING PRESS

BACKGROUND AND SUMMARY OF THE INVENTION

The present invention relates to a tire vulcanizing press and more particularly to a hydraulic tire vulcanizing press of the type which includes a hydraulic cylinder for tightly closing a die assembly with a raising and lowering table disposed between the hydraulic cylinder and the die assembly.

A hitherto known tire vulcanizing press of the above-described type is generally constructed such that the rasing and lowering table has a working stroke of about 1,000 mm in the case of tires for a passenger car and about 2,000 mm in the case of tires for a truck, bus or the like in order to ensure that a green tire to be vulcanized is placed on a lower die half of the die assembly without interference with any part of the press. It is natural that the hydraulic cylinder for tightly closing the die assembly is designed to have a long working stroke corresponding to the working stroke of the raising and lowering table. Since the conventional tire vulcanizing press is constructed in the above-described manner, there is a fear that the die clearance between both the upper and lower die halves exceeds an allowable limit when a reduction in hydraulic pressure takes place in the press cylinder due to leakage from packing in the hydraulic piping or the like and thereby the thermal energy carrier for vulcanization (steam, hot water at a high pressure, high temperature and high pressure gas or the like) maintained in the die assembly, leaks therefrom. To prevent an occurance of the leakage of thermal energy carrier there has already been proposed an arrangement of an expensive breach lock ring, control of the hydraulic pressure with the aid of a pressure switch, etc. However, it has been found that these proposals are not always satisfactory as means for preventing an excessive die clearance between both the upper and lower die halves.

Thus, the present invention is intended to obviate the drawbacks inherent to the conventional tire vulcanizing press as described above. A tire vulcanizing press in accordance with the present invention is constructed such that a die assembly is tightly closed by means of a press cylinder with a raising and lowering table (lift table) disposed therebetween, wherein a spacer is displaceably disposed between the press cylinder and the raising and lowering table (lift table) so that a predetermined die closing force is transmitted from the press cylinder to the die assembly via the spacer and the raising and lowering table when the die assembly is to be tightly closed.

Hence, it is an object of the present invention to provide a tire vulcanizing press which is able to reliably prevent an occurance of excessive die leaking with the aid of mechanical means.

It is another object of the present invention to provide a tire vulcanizing press which is safe to operate.

It is a further object of the present invention to provide a tire vulcanizing press which is simple in structure and thus can be manufactured inexpensively.

Due to the arrangement that a spacer is displaceably disposed between the press cylinder and the raising and lowering table (lift table) and a predetermined die closing force is transmitted from the press cylinder to the die assembly via the spacer and the raising and lowering table, when the die assembly is to be tightly closed, is ensured that the spacer is caused to move to a position located at the central part of the raising and lowering table in correct alignment with a press rod of the hydraulic cylinder after the raising and lowering table is lowered, the press cylinder is designed to have a very short working stroke which is dimensioned sufficiently to exert a predetermined die closing force on the die assembly. The working stroke is less than the allowable die opening limit, and any excessive die opening is reliably prevented by the minimized working stroke of the press cylinder and the arrangement of the spacer when a reduction in the hydraulic pressure takes place in the press cylinder due to mechanical failure or the like. As a result, no danger of leakage of the thermal energy carrier for vulcanization is created. Furthermore, due to the arrangement that the press cylinder is designed to have a very short working stroke with the spacer disposed between the press cylinder and the raising and lowering table, it is ensured that the die assembly is closed tightly closed quickly and correctly.

Other objects, features and advantages of the present invention will become apparent from the reading of the following description made in conjunction with the accompanying drawings.

The accompanying drawings will be briefly described below.

FIG. 3 is a side view of a spacer and its associated members for the vulcanizing press, shown in an enlarged scale, and FIG. 4 is a side view of the spacer capped with an adjustment nut, shown in an enlarged scale.

Now the present invention will be described in a greater detail with reference to the accompanying drawings which illustrate a preferred embodiment of the invention.

Figure 1:
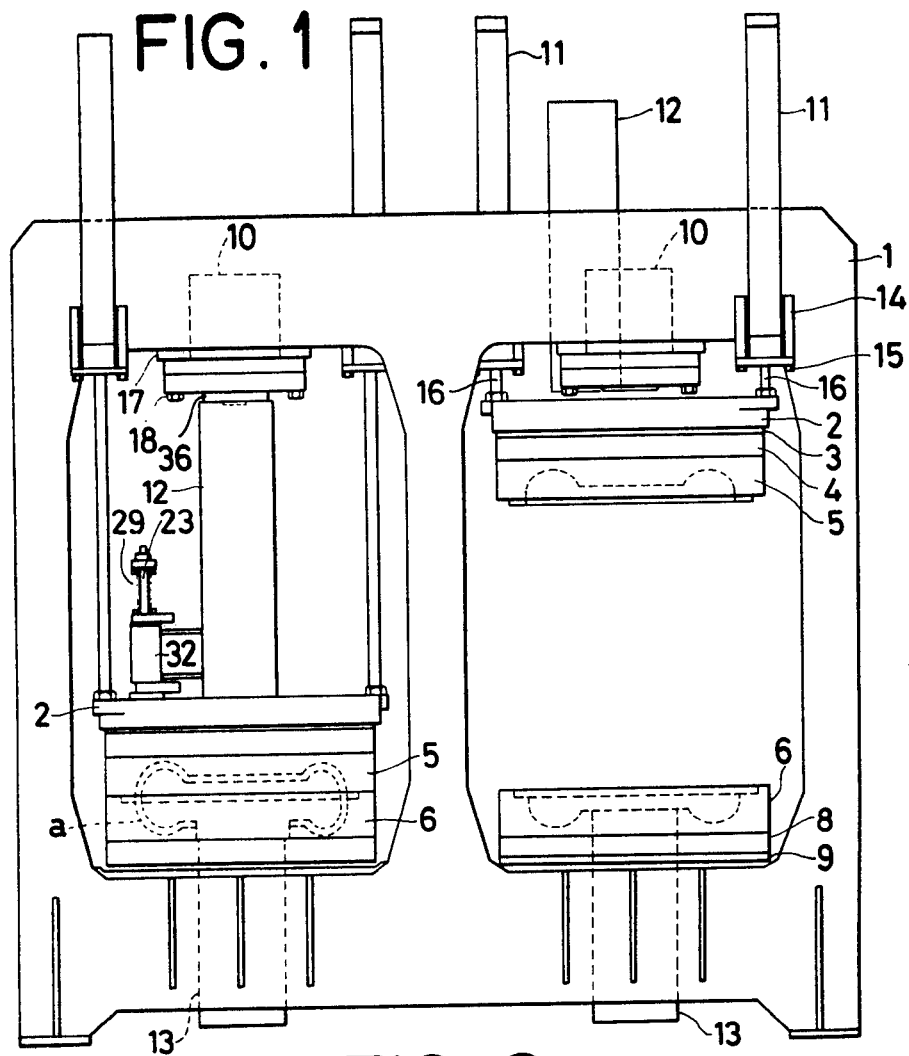
FIG. 1 is a front view of a tire vulcanizing press in accordance with an embodiment of the present invention.
Figure 2:
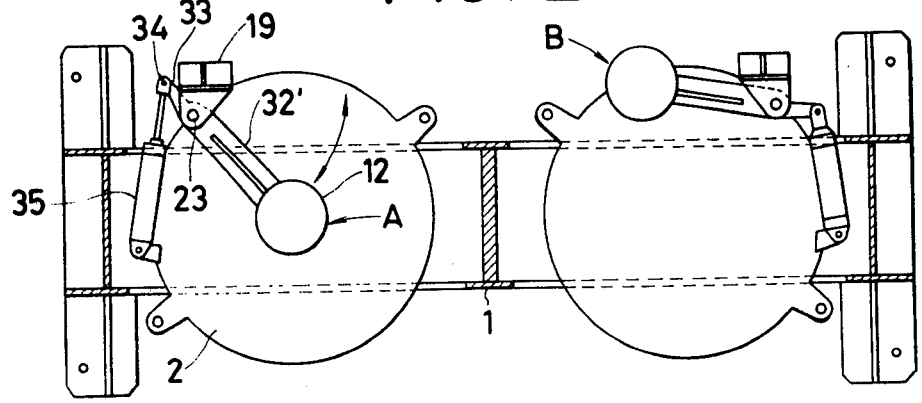
FIG. 2 is a plan view of the tire vulcanizing press in FIG. 1.

In the embodiment as illustrated in FIGS. 1 to 3 reference numeral 1 designates a press frame, reference numeral 2 is a raising and lowering table, reference numeral 3 is a thermal insulating plate, reference numeral 4 is an upper hot plate, reference numeral 5 is an upper die half, reference numeral 6 is a lower die half, reference letter a is a tire to be vulcanized, reference numeral 8 is a lower hot plate, reference numeral 9 is another thermal insulating plate, reference numeral 10 is a press cylinder, reference numeral 11 is an auxiliary cylinder, reference numeral 12 is a spacer and reference numeral 13 is a thermal energy carrier feeding device. The tire vulcanizing press in accordance with the present invention is constructed by a combination of the essential components as described above.

FIG. 1 is a front view of a twin press of the invention. The left-hand press is shown in a die closed state where a tire is under vulcanization in a die assembly, whereas the right-hand press is shown in a die opened state where the die assembly is ready for receiving the next tire to be vulcanized. Each of the auxiliary cylinders 11 is fixedly secured to a bracket 14 on the side wall of the press frame 1 by means of bolts 15 and their rod 16 is connected to the raising and lowering table 2 at its lower end. The press cylinder, that is, the hydraulic cylinder 10 is fixedly mounted on the raised surface 17 of the upper portion of the press frame 1 by means of bolts 18. The hydraulic cylinder 10 is adapted to press both the upper and lower die halves 5 and 6 with a predetermined force by way of the lowered table 2 and the spacer 12 which will be described later. Thus, it requires a very short working stroke. The table 2, the insulating plate 3, the upper hot plate 4 and the upper die half 5 are firmly connected to one another by means of bolts (not shown), whereas the lower die half 6, the lower hot plate 8 and the insulating plate 9 are fixedly mounted on the press frame 1 by means of bolts (not shown).

As illustrated in FIGS. 2 and 3, the spacer 12 is disposed in the vertical direction on the table 2 in such a manner as to move in the horizontal direction. Specifically, the spacer 12 is movable in the horizontal direction by turning about a shaft 23 which is pivotally held by means of a pair of bushings 21 and 22 on a bracket 19 fixedly mounted on the end part of the table 2 by means of bolts 20. Further, the shaft 23 includes a nut 25 screwed on the upper part of the shaft 23, a washer 26, a thrust bearing 27 in a bearing holder 28, a coil spring 29, a washer 30 disposed above the bushing 21 and a washer 31 disposed beneath the same so that the shaft 23 is normally urged upward by the expansive force of the coil spring 29. The spacer 12 is connected to the shaft 23 by way of an arm 32' and a sleeve 32, and pins 24 are extended through the shaft 23 and the sleeve 32. Thus, as long as the spacer 12 is located away from the press rod 36 of the hydraulic cylinder 10, the shaft 23 is raised up by means of the coil spring 29, and thereby a close clearance is created between the lower end of the spacer 12 and the upper surface of the table 2 so that pivotal movement of the spacer 12 is ensured.

As is apparent from FIG. 2, the arm 32' has an extension 33 in the form of a lever of which outermost end is connected to a rod end of a cylinder 35 by way of a joint 34, said cylinder 35 being pivotally mounted on the end part of the table 2. By actuating the cylinder 35 back and forth the spacer 12 is caused to turn about the shaft 23 in the directions as identified by arrow marks whereby it occupies a position A as shown in the left half of the drawing or a position B as shown in the right half of the same. It should be noted that reference numeral 37 designates an adjustment liner fitted into the uppermost end of the spacer 12 so as to adjust an effective height of the latter.

Next, operations of the tire vulcanizing press constructed in the above-described manner will be described below.

While the tire vulcanizing press is kept at the die opened state as illustrated in the right half of FIG. 1, a green tire a to be vulcanized is transferred from the outside with the aid of a conveyance system (not shown) and it is then placed on the lower die half 6. Next, by actuating the auxiliary cylinders 11 the upper die half 5 is lowered together with the table 2, the insulating plate 3 and the upper hot plate 4 until it is located in correct alignment with the lower die half 6. When the hydraulic or pneumatic cylinder 35 is actuated so that its rod is expanded, the spacer 12 is displaced from the position B to the position A in FIG. 2 until it is located directly beneath the press rod 36 of the hydraulic cylinder 10 at the central position of the table 2. As the hydraulic cylinder 10 is actuated and thereby the press rod 36 is displaced downward, the upper die half 5 is tightly pressed on the lower die half 6 by way of the spacer 12 and the table 2 so as to ensure an intended die clamping with the predetermined force.

Next, removal of the vulcanized tire is carried out by way of the following steps. The press rod 36 of the hydraulic cylinder 10 is first restored to the original position and thereafter the spacer 12 is raised up by the resilient force of the coil spring 29. As the rod of the cylinder 35 is retracted, the spacer 12 is caused to move to the position B in FIG. 2 in the horizontal direction whereby it is located away from the working position of the press cylinder 10. After it is confirmed that the spacer 12 occupies the position B, the auxiliary cylinders 11 are actuated and thereby the upper die half 5 is raised up together with the table 2 by means of the rods 16 up to the elevated position as illustrated in the right half of FIG. 1. Now the vulcanized tire is ready to be removed from the lower die half 6.

When a green tire a to be vulcanized has different dimensions, there the necessity for another vulcanizing die assembly having a different height. To adjust to the dimensional change, the adjustment liner 37 on the top end of the spacer 12 is removed or replaced with another one. Alternatively, one or more other liners may be added to the adjustment liner 37. Further, height adjustment may be carried out by rotating an adjustment nut 38 screwed on the upper threaded part of the spacer 12, as illustrated in FIG. 4.

As a modification from the arrangement of the adjustment liner 37 or the adjustment nut 38, it is advisable to design the press cylinder 10 in such a manner as to have an increased working stroke equivalent to a dimensional change in thickness of the die assembly and equip the press cylinder 10 with a pilot operated check valve in order to prevent working hydraulic pressure in the press cylinder 10 from being reduced due to the increased working stroke.

Since the tire vulcanizing press of the invention is constructed such that when a green tire a is to be vulcanized the table 2 is lowered together with the upper die half 5, and then the spacer 12 is caused to move to the position A located at the central part of the table 2 in correct alignment with the press rod 36 of the hydraulic cylinder 10, and thereafter both the upper and lower die halves 5 and 6 are tightly closed by means of the hydraulic cylinder 10 with the spacer 12 and the table 2 disposed therebetween, it becomes possible to design the press cylinder 10 with a minimized working stroke which is sufficient to allow a required die clamping force to be exerted on the die assembly.

Another advantageous feature of the present invention is that a die opening between both the upper and lower die halves 5 and 6 is limited within an allowable range due to the minimized working stroke of the press cylinder 10 and the arrangement of the spacer 12 when there takes place a reduction in the hydraulic pressure due to mechanical problems, failure or the like.

Further another advantageous feature of the present invention is that the arrangement of the adjustment liner 37 or the adjustment nut 38 on the uppermost end of the spacer 12 makes it possible to maintain a distance between the upper end of the spacer 12 and the lower end of the press rod 36 substantially constant and short at all time irrespective of any replacement with another die assembly having different dimensions whereby excessive die opening between both the upper and lower die halves is practically prevented.

While the present invention has been described above with respect to the illustrated embodiment, it should be of course understood that it should be not limited only to this but various changes of modifications may be made without departure from the spirit and scope of the invention.

I claim:

1. A tire-vulcanizing press comprising a die assembly closed by a pressure cylinder through a lift table, wherein said pressure cylinder is attached to a press frame surrounding said die assembly in a manner which is coaxial with the center line of said die assembly, said vulcanizing press further comprising a spacer attached to said lift table and operative to be interposed between said pressure cylinder and said lift table so as to transmit the pressure force of said pressure cylinder to said die assembly, said spacer being adapted to swing to a position which will not interfere with other elements of the press at the time of release of said die assembly.

2. The tire vulcanizing press as defined in claim 1, characterized in that an upper die half is fixedly secured to the lift table so that said upper die half is displaced in the upward and downward direction together with the lift table.

3. The tire vulcanizing press as defined in claim 1, characterized in that means are provided for adjusting the height of the spacer.

4. The tire vulcanizing press as defined in claim 1, characterized in that the spacer is normally biased in the upward direction by means of a coil spring so that there is created a close clearance between the lower end of the spacer and the upper surface of the lift table when the die assembly is released from its tightly closed state.

5. The tire vulcanizing press as defined in claim 1, wherein a lower die half is fixedly mounted on the press frame and is in communication with a thermal energy carrier feeding device for ensuring the intended vulcanization.

* * * * *